US006925305B2

(12) United States Patent
Dawson et al.

(10) Patent No.: US 6,925,305 B2
(45) Date of Patent: Aug. 2, 2005

(54) INFORMATION MANAGEMENT SYSTEM (75) Inventors: Jeffrey Scott Dawson, Dallsas, TX (US); Mark Guvernator, Garland, TX (US); Wendy Marie Mauck, Flower Mound, TX (US); Justin Clay Williams, Flower Mound, TX (US)

(73) Assignee: AirBand Communications, Inc., Dallas, TX (US)

( * ) Notice: Subject to any disclaimer, the term of this patent is extended or adjusted under 35 U.S.C. 154(b) by 0 days.

(21) Appl. No.: 10/144,844

(22) Filed: May 15, 2002

(65) Prior Publication Data

US 2003/0216953 A1 Nov. 20, 2003

(51) Int. Cl.[7] .......................... H04B 17/60; G06F 17/60
(52) U.S. Cl. ...................... 455/446; 455/456.1; 705/10
(58) Field of Search .............................. 445/446, 456.1, 445/456.3, 456.5; 705/10

(56) References Cited

U.S. PATENT DOCUMENTS

| | | | |
|---|---|---|---|
| 6,332,163 B1 | 12/2001 | Bowman-Amuah | |
| 6,389,289 B1 * | 5/2002 | Voce et al. | 455/456.5 |
| 6,477,376 B1 * | 11/2002 | Carter | 455/446 |
| 6,519,642 B1 | 2/2003 | Olsen et al. | |
| 6,640,103 B1 * | 10/2003 | Inman et al. | 455/446 |
| 6,795,707 B2 * | 9/2004 | Martin et al. | 455/446 |

FOREIGN PATENT DOCUMENTS

WO   WO 9820434 A2 *  5/1998  .......... G06F/17/30
WO   WO0065761 A2 * 11/2000

OTHER PUBLICATIONS

"Local Comptetition: WinsStar starts services in three more cities. Completes New York network infrastructure wireless fiber capacity growth accelerates"; Sep. 1997; Edge, on & about AT&T, v12, p9(1): Dialog file 275, Accession No. 02106681.*

"Winstar Communications: WinStar Communications reports first quarter revenues up 32%; Reports progress in roll out of Wireless Fiber business"; Jul. 1995; Business Editors & Telecommunications Industry Writers: Dialog file 810.*

Bort Julie "The New Deal"; Nov. 1998, Inc. V20n17 Inc. Technology Supplement) PP: 62–75); Dialog file 15, Accession No. 01732170.*

"BT and MCI Announce Concert Inbound Service"; Apr. 1996; PR Newswire, p0410NYW044; Dialog file 16, Accession No. 04295415.*

* cited by examiner

Primary Examiner—Romain Jeanty
(74) Attorney, Agent, or Firm—Steven B. Kelber; DLA Piper Rudnick Gray Cary US LLP (57) ABSTRACT

In a method and apparatus for managing information relating to a wireless service provider enterprise, sites having potential customers are classified based on an ability to obtain legal rights to install a wireless infrastructure at the site and an ability of a wireless service provider network to provide an acceptable signal to the site. Customers at the site are classified according to the site classification. Information in the system is displayed in a site-centric format.

12 Claims, 8 Drawing Sheets

Hunting Grounds - Microsoft Internet Explorer

Address: http://oims.airband.com/reports/hunting_ground.asp airBand — AIMS: airBand Information Management System
mmcomick 1/17/2002 Login/Logout Hunting Ground
Assign Buildings to My AEs
Sales Home
22 Sites Found

| Site Id | Market Site Name | Address | City | State | Base Station | Tenants | Promo | AE | RSM | Status | |
|---|---|---|---|---|---|---|---|---|---|---|---|
| 246 | 101 E Renner Rd | 101 E Renner Rd | Richardson | TX | US DATA | 26 | | cleonard | jmaynard | Target | Customers |
| 485 | 10501 N Central Expy | 10501 N Central Expy | Dallas | TX | KTVT | 24 | | cleonard | jmaynard | Target | Customers |
| 961 | Summit Square Bus. Cntr | 1100 Summit Ave | Plano | TX | US DATA | 8 | SNIPER | cleonard | jmaynard | Target | Customers |
| 974 | 1101 E Plano Pkwy | 1101 E Plano Pkwy | Plano | TX | US DATA | 5 | | cleonard | jmaynard | Target | Customers |
| 1415 | 11441 N Stemmons Fwy | 11441 N Stemmons Fwy | Dallas | TX | GREYSTONE | 16 | | cleonard | jmaynard | Target | Customers |
| 2241 | 1350 E Arapaho Rd | 1350 E Arapaho Rd | Richardson | TX | US DATA | 9 | | cleonard | jmaynard | Target | Customers |
| 3136 | One Signature Place | 14755 Preston Rd | Dallas | TX | SW BELL | 33 | SNIPER | cleonard | jmaynard | Target | Customers |
| 3142 | Two Signature Place | 14285 Preston Rd | Dallas | TX | SW BELL | 56 | | cleonard | jmaynard | Target | Customers |
| 3184 | 14902 Preston Rd | 14902 Preston Rd | Dallas | TX | SW BELL | 52 | SNIPER | cleonard | jmaynard | Target | Customers |
| 4108 | 1771 International Pkwy | 1771 International Pkwy | Richardson | TX | US DATA | 13 | | cleonard | jmaynard | Target | Customers |
| 25958 | 2611 Westgrove Dr | 2611 Westgrove Dr | Carrolton | TX | CITIPLACE | 5 | | cleonard | jmaynard | Target | Customers |
| 6709 | Citiplace | 2711 N Haskell Ave | Dallas | TX | GREYSTONE | 59 | | cleonard | jmaynard | Target | Customers |
| 6696 | 2775 Villa Creek Dr | 2775 Villa Creek Dr | Dallas | TX | GREYSTONE | 9 | | cleonard | jmaynard | Target | Customers |
| 18561 | 3068 Forest Ln | 3068 Forest Ln | Carrolton | TX | SW BELL | 21 | | cleonard | jmaynard | Target | Customers |
| 8340 | 3410 Midcourt Rd | 3410 Midcourt Rd | Addison | TX | SW BELL | 11 | | cleonard | jmaynard | Target | Customers |
| 14934 | 4004 Belt Line Rd | 4004 Belt Line Rd | Addison | TX | SW BELL | 22 | | cleonard | jmaynard | Target | Customers |
| 10428 | 4801 Keller Springs Rd | 4801 Keller Springs Rd | Addison | TX | SW BELL | 17 | | cleonard | jmaynard | Target | Customers |
| 32721 | Liberty Plaza I | 5055 Keller Springs Rd | Dallas | TX | OXY | 7 | | cleonard | jmaynard | Target | Customers |
| 27717 | 5310 Harvest Hill Rd | 5310 Harvest Hill Rd | Dallas | TX | OXY | 47 | | cleonard | jmaynard | Target | Customers |
| 12212 | 6330 LBJ Fwy | 6330 LBJ Fwy | Dallas | TX | OXY | 19 | | cleonard | jmaynard | Target | Customers |
| 13449 | 801 E Plano Pkwy | 801 E Plano Pkwy | Plano | TX | US DATA | 10 | | cleonard | jmaynard | Target | Customers |
| 28946 | 9603 White Rock Trl | 9603 White Rock Trl | Dallas | TX | US KTVT | 4 | | cleonard | jmaynard | Target | Customers |
| | | | | | Total | 464 | | | | | |

INFORMATION MANAGEMENT SYSTEM

BACKGROUND OF THE INVENTION

1. Field of the Invention

The invention relates to information management generally, and more particularly to a method and apparatus for managing information relating to a fixed wireless communications service provider.

2. Discussion of the Background

In many areas, high data rate telecommunications services such as T1 lines and other broadband data services are not readily available. In such an area, a customer desiring high data rate service is often required by the local telephone company to pay a special construction fee and/or sign a long term contract in order to obtain the service. Fixed wireless communications services can provide a competitive alternative to wired high data rate service in these and other situations, both in terms of cost and of the time required for the commencement of services once they have been ordered. In other areas, high data rate service is not available, leaving wireless service as the only alternative.

Providing fixed wireless services involves a different set of problems as compared to providing wired services or mobile wireless services. In order to provide wireless service to a potential customer, two distinct hurdles must be overcome. The first hurdle involves securing the legal rights to install the requisite wireless infrastructure. As used herein, wireless infrastructure means the physical devices that must be installed at that customer's site in order to provide wireless communications services to a customer. Wireless infrastructure typically includes an antenna, wiring and routers/switches between the customer and the antenna. Antennas usually must be installed somewhere on the exterior of a building, typically the roof. Obtaining the permission of the owner of a building to install the antenna and run wire from the antenna to the customer can be a difficult issue when the owner of the building is not the potential customer. While some building owners freely give permission to install antennas, others will not under any circumstances while yet others will allow the installation for a price. In addition to obtaining permission from the building owner, local regulations and ordinances may also have an impact on the ability to install the requisite wireless infrastructure. As used herein, 'legal rights' encompasses all of these issues.

Even if the first hurdle, obtaining legal rights to install a wireless infrastructure for a building, can be cleared, a second hurdle remains: the wireless communications service provider must also be able to provide an acceptable signal to the wireless infrastructure. Typically, but not necessarily, this connection requires that there be a clear line of sight between the antenna installed at the customer's site and a wireless communications service provider's access point (also referred to as a hub). Given the complexity of many urban landscapes, making this determination is often not a simple matter whether or not a clear line of sight is required.

Organizing sales activity for a wireless communications system provides a unique challenge. Ideally, sales activity should be focused on those potential customers at a site for which legal rights have been or can be obtained and which can be serviced by the wireless communications service provider. However, providing this focus has proven to be difficult.

What is needed is a method and system for classifying potential customers so that sales activity can be focused on the most promising potential customers and for managing the various information associated with a wireless service provider enterprise.

SUMMARY OF THE INVENTION

The present invention meets the aforementioned need to a great extent by providing a method and system for organizing information relating to various aspects of a fixed wireless service provider enterprise. In one aspect of the invention, sites identified as having potential customers are classified according to sales potential, thereby allowing sales activities to be directed toward the most promising sites. The classification process uses indications as to the real estate friendliness of the site and the ability of the wireless server's network to provide an acceptable signal to this site to make this classification. In another aspect of the invention, commissions are tracked as information such as the procurement of legal rights for a site is entered into the system by users. In another aspect of the invention, data is provided to users in a site centric fashion.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein:

FIG. 5 is a screen shot of a list of priority sites according to an embodiment of the present invention.

DETAILED DESCRIPTION OF THE PREFERRED EMBODIMENTS

The present invention will be discussed with reference to preferred embodiments of methods and system for managing information relating to a fixed wireless service provider. For ease of understanding, certain method steps are delineated as separate steps; however, these steps should not be construed as necessarily distinct nor order dependent in their performance. Specific details, such as specific types of information and specific commercially available programs with which the invention can be utilized, are provided in order to provide a thorough understanding of the invention. The preferred embodiments discussed herein should not be understood to limit the invention.

In its broadest sense, the invention is a system and method for organizing the information necessary for an enterprise offering wireless services. This information relates to all aspects of the business and includes information pertaining to portfolios of roof rights (as used herein, "roof rights" refers to a legal right to install a wireless infrastructure, which is typically, but not necessarily, installed on the roof a building) held by the wireless service provider and roof rights that can be obtained by the wireless service provider, commissions, inventories and locations of wireless infrastructure equipment, engineering data, leases, contacts, and other types of information.

Figure 1:
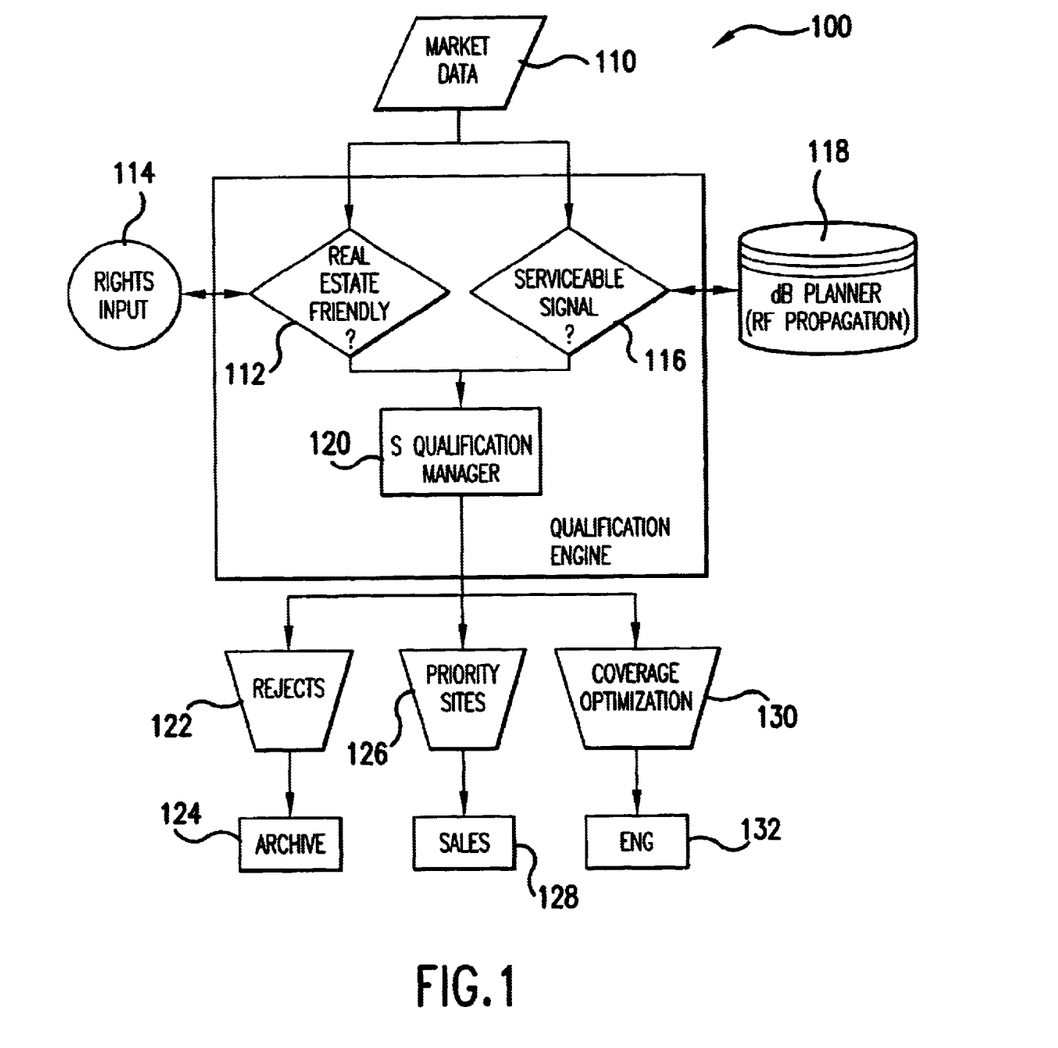
FIG. 1 is a flow diagram illustrating a potential customer classification process according to an embodiment of the present invention.

Referring now to the drawings, wherein like reference numerals designate identical or corresponding parts, a data flow diagram 100 of one aspect of the invention is illustrated in FIG. 1. The aspect of the invention illustrated in FIG. 1 relates to the classification of potential customers to provide guidance as to where sales activities should be focused to reach the most promising potential customers and also to provide guidance on potential areas for future expansion of the wireless service provider's network.

The process begins with marketing data 110, which is a list of sites that has been identified as containing potential customers. As used herein, the term site refers to a location at which a wireless infrastructure may be installed. Typically, but not necessarily, a site refers to a single building. However, there are instances in which a site is different from a building. For example, in some buildings that include an addition, it is cheaper and/or easier to install two separate wireless infrastructures rather than attempting to service the entire building with a single infrastructure as running cables between the original building and the addition may be difficult. The information used to identify the list of sites can come from a variety of sources, including responses to mass-mailed advertisements from potential customers, sales leads, the fact that a site not currently being served by the wireless service provider is owned and/or operated by the same owner as another site to which services are provided and various other sources.

In the preferred embodiment, the invention is site-centric in that the site is used as the primary method of data organization. Thus, a site rather than a specific customer, is what appears on the marketing data list even though only a single potential customer from that site (which may include several other, distinct potential customers) has indicated interest in the wireless service provider's service offerings. This is not to say that data concerning individual customers is not maintained; rather, it is primarily grouped and accessed by site.

Figure 2:
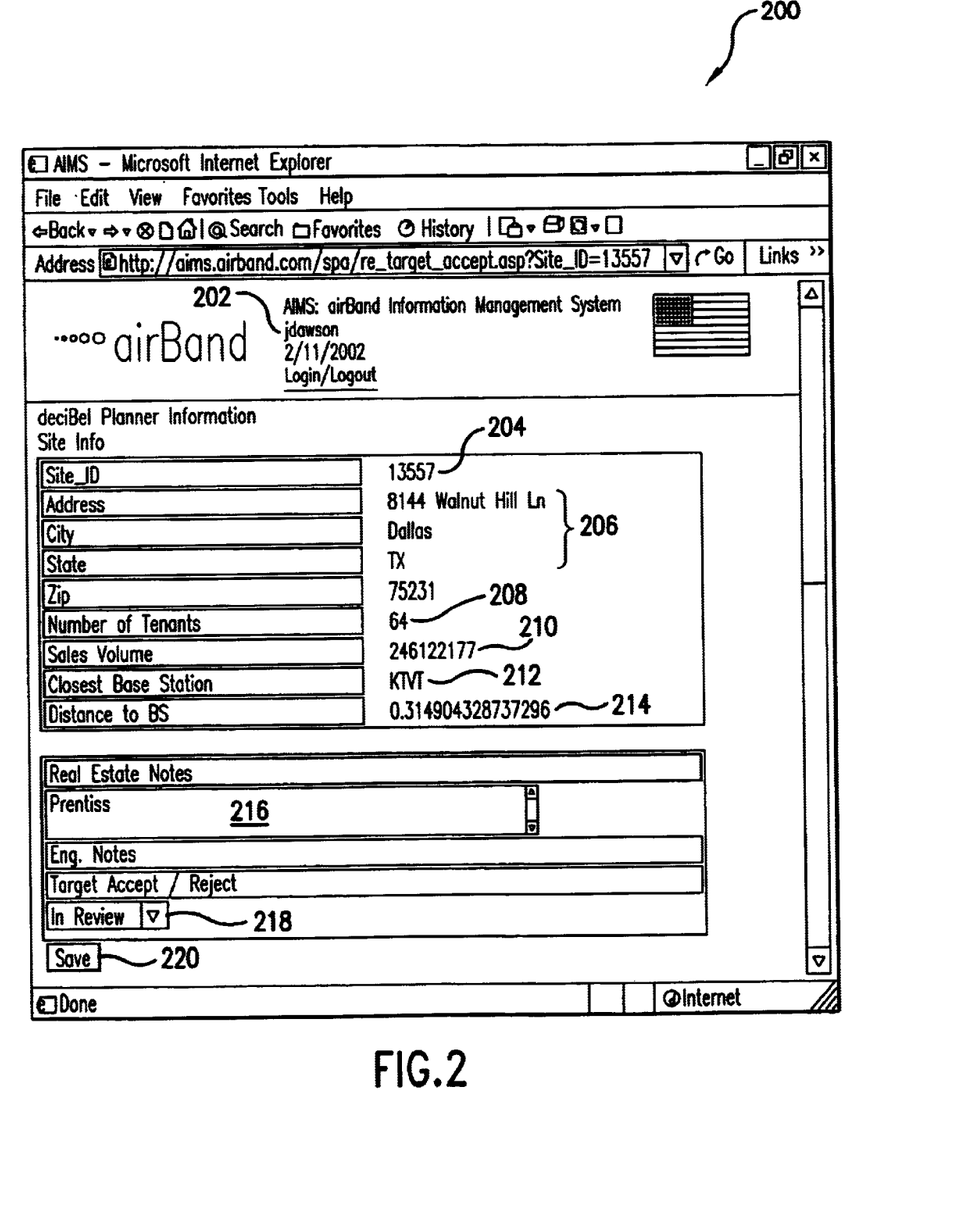
FIG. 2 is a screen shot illustrating a real estate group user interface according to an embodiment of the present invention.

Sites in the market data 110 undergo two separate evaluations. First, a determination is made at step 112 as to whether a site is "real estate friendly," that is, whether legal rights have or can be obtained for a site at a reasonable cost, and under reasonable terms and conditions. This determination is based on input 114 from users in a real estate group, who are responsible for carrying out negotiations with the landlord of the site. An exemplary user interface 200 through which a real estate group member may input the information is shown in FIG. 2. The interface 200 includes a user identification field 202. By requiring users to log on to the system and provide a password, the system can track input to the system by user, which facilitates such functions as tracking commissions as discussed in further detail below.

The user interface 200 also includes a site identification field 204, a site address field 206, a field 208 indicating the number of tenants, and a sales volume field 210. Other fields 212 and 214 indicate the closest base station to the site and the distance to the site from that base station, respectively.

Notes pertaining to real estate aspects of the site, such as the name of the landlord and/or management company for the site, permit requirements for the site, and/or, if known, the cost of obtaining roof rights, are maintained in field 216. Field 218 allows the real estate group user to indicate the real estate friendliness of the site. Possible choices in some embodiments are "in review," "accepted" and "reject." The user presses the save button 220 when the appropriate indication as to real estate friendliness has been made.

In some embodiments in which individuals in the real estate group are paid commissions based on the procurement of legal rights, the system also tracks commissions. For example, individual sites in the market data 110 may be assigned to specific personnel in the real estate group. As roof rights for each site are secured, a lease record is created. The lease record includes all of the terms and conditions of the lease. The lease record is then linked to each site to which it pertains. This triggers the system to credit a commission to the appropriate individual. In other embodiments in which the commission is based not only on securing legal rights but also is based on actual sales of services to customers at the site, the system also tracks the necessary sales information in order to ensure that the proper commission is credited to the member of the real estate group who procured the legal rights.

Figure 3:
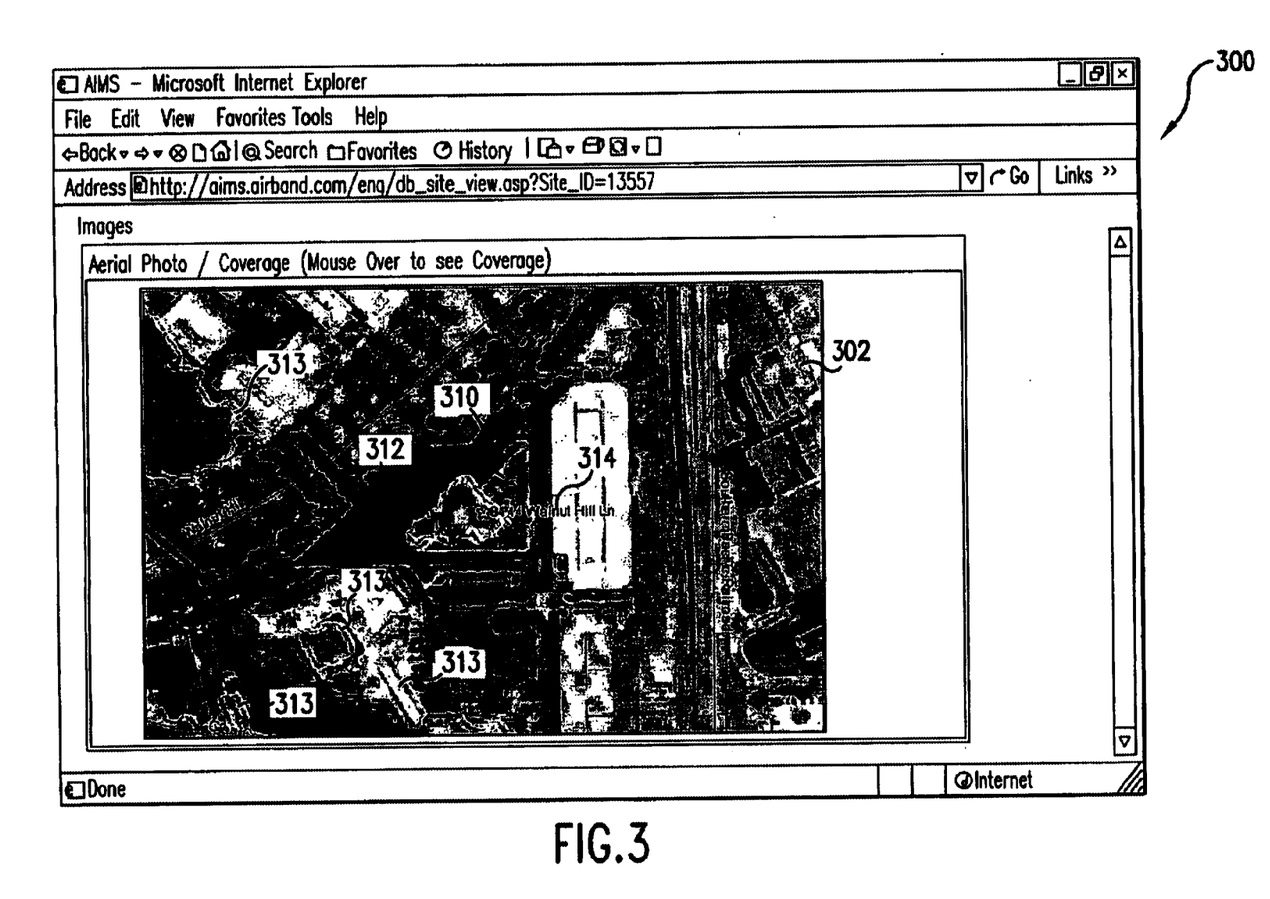
FIG. 3 is a screen shot illustrating an output of a coverage prediction display according to an embodiment of the present invention.

Referring now back to FIG. 1, in addition to the determination of real estate friendliness at step 112, a determination as to whether a serviceable signal can be provided to the site is made at step 116. In preferred embodiments, this determination is made using commercially available programs sold under the trademarks deciBel Planner (Marconi Corporation) and MapInfo (MapInfo Corporation); however, other tools could be used in other embodiments of the invention. Generally speaking, the deciBel Planner program integrates electromagnetic wave propagation models that interface with a MapInfo spatially-enabled terrain database. The terrain databases can be obtained from commercial entities such as MapInfo Corp. that perform fly-overs of a desired area to obtain photographs and terrain information for the desired area. An example of a screen output 300 from the deciBel Planner program is shown in FIG. 3. The screen output includes a photograph 302 of an urban area including a potential site in the form of a building 310. The screen output 300 includes color coded (with the colors representing signal strength) representations of a coverage area 312 over the building 310 as well as other coverage areas 313. The coverage area 312 over the building 310 signifies that the building 310 is serviceable by the wireless service provider's network and that an antenna for a wireless infrastructure may be placed in the coverage area 312 on the roof of the building 310.

Also shown in FIG. 3 is the address 314 of the building 310. In one embodiment the address information was obtained by sending out a person with a handheld GPS (global position sensor) device and recording GPS coordinates for potential sites. Once the deciBel planner has been initially configured (including entering the location of the wireless service provider's hubs, specification of hub transmitting power and required signal strength, and preparing the terrain/picture database), the only input that is required to obtain an output such as the screen output 300 is the specification of a desired latitude/longitude. By preparing a database of site addresses and associated GPS coordinates, it becomes possible to obtain the output screen 300 of FIG. 3 by simply specifying the address and using the aforementioned database to translate the address into latitude and longitude coordinates. In some embodiments, the deciBel planner is integrated with the other portions of the program such that an address can be specified to the deciBel planner by simply clicking on it; in other embodiments, the deciBel planner is a stand-alone application and a user is required to manually enter the address into the deciBel planner and an indication as to whether a serviceable signal can be supplied to the site must be entered manually at step 116.

Referring now back to FIG. 1, once the determinations as to real estate friendliness and whether the site is serviceable by the wireless service provider have been made, the sites are evaluated by the qualification manager 120. If the site has been evaluated rejected by the real estate group as not real estate friendly, the site is listed as a reject at step 122 and data for the site is placed in an archive 124. If the site has been evaluated as real estate friendly by the real estate group and the engineering group indicates that a serviceable signal is can be provided, the site is designated as a priority site at step 126 and is entered on the sales group priority sites list 128. Finally, if the site is real estate friendly but it is not possible to provide a serviceable signal given the current state of the wireless service providers' network, the site is classified for coverage optimization at step 130 and is entered on the coverage optimization list 132 for consideration by engineering. This list facilitates the decision as to where the wireless service provider's network is to be expanded in the future. Although it is not the only factor in the decision, the existence of a concentration of real estate friendly sites in one area might be a reason why network expansion should occur in that area.

It should be understood that the above-described classification process is not necessarily a one-time, static event. Rather, the process can be ongoing with additional potential sites being added to the marketing data 110 as new information becomes available and as the wireless service provider's network continues to change. Furthermore, it is expected that the real estate and engineering groups will communicate with each other during the evaluation process such that a particularly attractive site from the real estate group's point of view will be evaluated by engineering before other, less promising sites. Also, buildings that were once classified as rejects may be moved back into the marketing data for further evaluation in the event that the previous situation changes (such as when ownership of a site changes hands). Simply put, the classification process can be a dynamic process that is performed continuously, periodically, or sporadically over a long period of time as dictated by the needs of the particular users of the system. It should also be understood that order in which the determinations as to real estate friendliness and serviceable signals are made is not important and may differ. For example, sometimes roof rights to a portfolio of sites managed and/or owned by a single entity are obtained. In such a situations, some, none, or all of the sites may have been previously evaluated by the engineering group to determine whether a serviceable signal could be provided.

Figure 4:
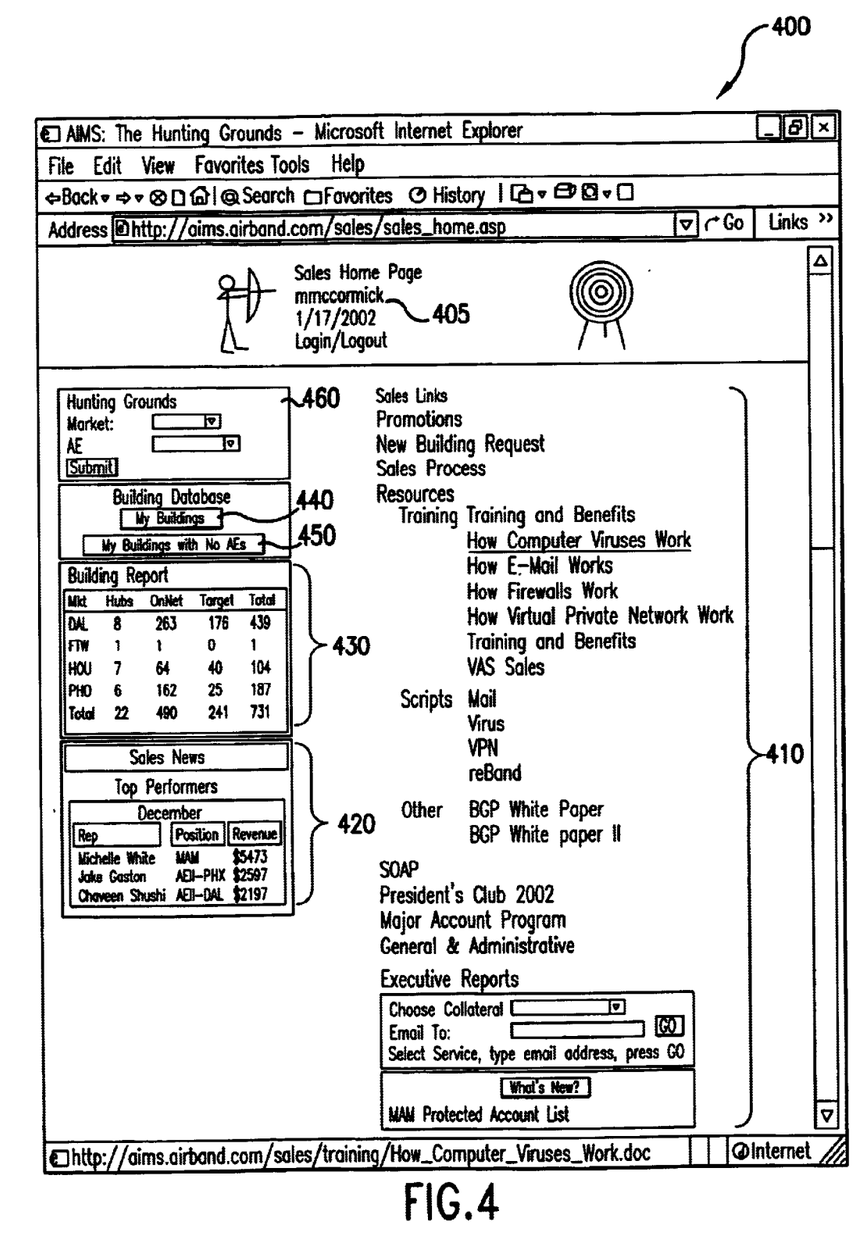
FIG. 4 is a screen shot of a sales group home page according to an embodiment of the present invention.

Once sites have been classified as priority sites, they become the focus of sales activity. The invention provides a home page 400 for the sales group as shown in FIG. 4. As indicated by the user field 405, the home page requires the sales group user to log in, both to protect the confidentiality of the sales data and to allow the system to track actions performed by each user. The home page 400 includes a plurality of links 410 to other information and system resources, as well as a number of information fields 420, 430. The home page 400 also includes a 'My Buildings' button that allows the sales group member (which may be a regional sales manager or account executive) to view sites that have been assigned to that member. A 'My Buildings With No AEs' button allows a regional sales manager user to view only those sites to which no account executive has yet been assigned. Finally, window 460 allows sites to be selected on the basis of the account executive to which the site is assigned and/or applicable geographical market (e.g., city).

Figure 6:
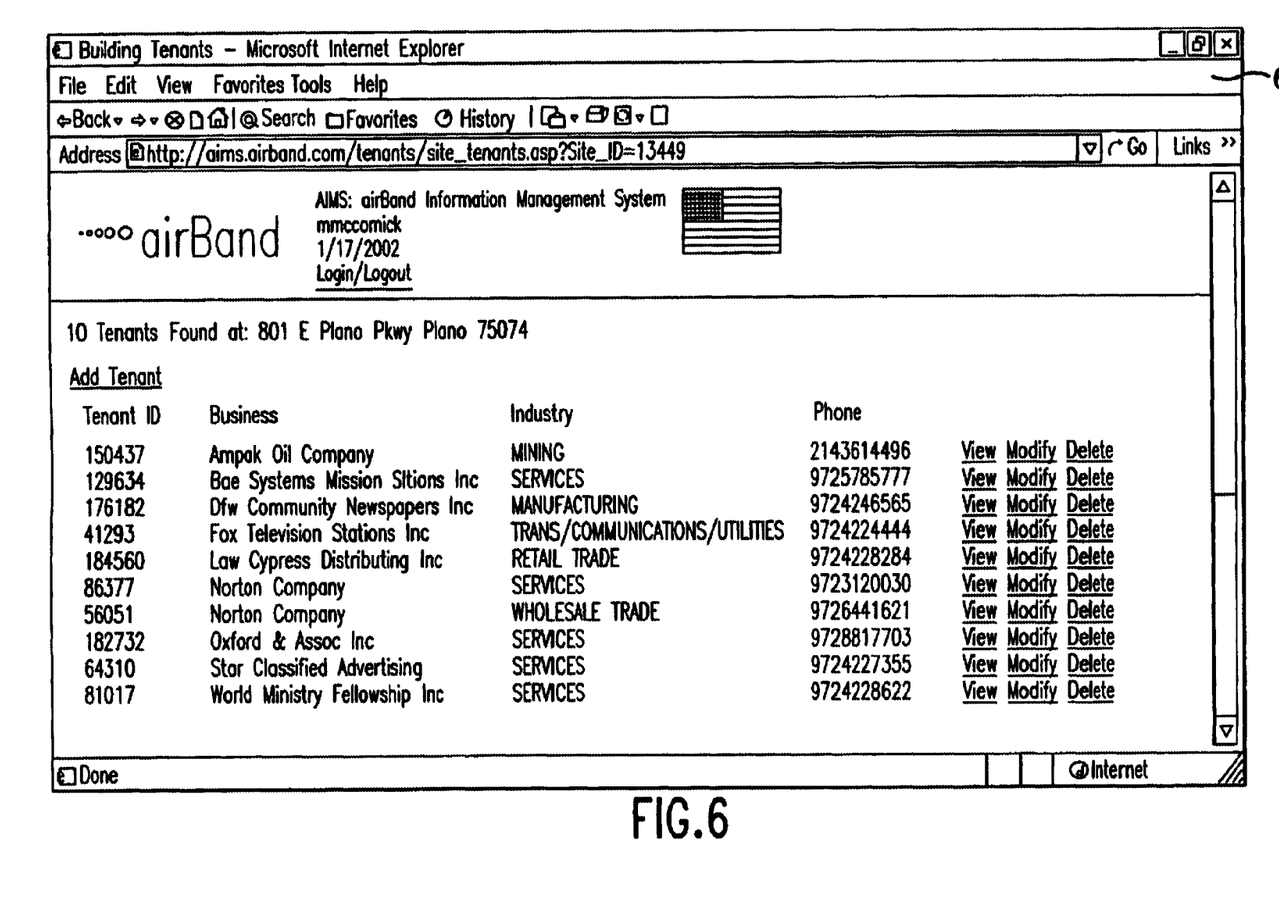
FIG. 6 is a screen shot of list of tenants at one of the sites of the list of FIG. 5.

When sites are selected via either of the site buttons 440 or 450 or via the window 460, they are presented to the user in a sites window 500 as shown in FIG. 5. The sites window 500 includes a field 510 that identifies the site identification number, a field 520 that identifies the site name, fields 522, 524, 526 that identify the address of the site, a field 530 that identifies the base station, or hub, through which the site is connected to the wireless service provider's network, a field 540 that identifies the number of tenants at the site, a field 550 that identifies any current sales promotions directed toward a site, and fields 560 and 570 that identify the account executive and regional sales manager to which the site has been assigned. Another field 580 indicates the site status: On Net (meaning a wireless infrastructure has been installed and the site is in communication with the service provider's network), Leased (meaning that a lease for the site has been signed and the process of installing a wireless infrastructure is underway); Target (indicating that the site has been approved by engineering and is real estate friendly), Coverage Optimization, and Reject. A Customers field 590 serves as a link to a list of current customers at the site. Some of the fields in the window 500 also include links to further information. For example, clicking on the number of tenants field 540 will produce a tenants window 600 that provides information for all tenants at the associated site. This information may be used for, among other things, producing a mailing list for a site-specific sales promotion.

Figure 7:
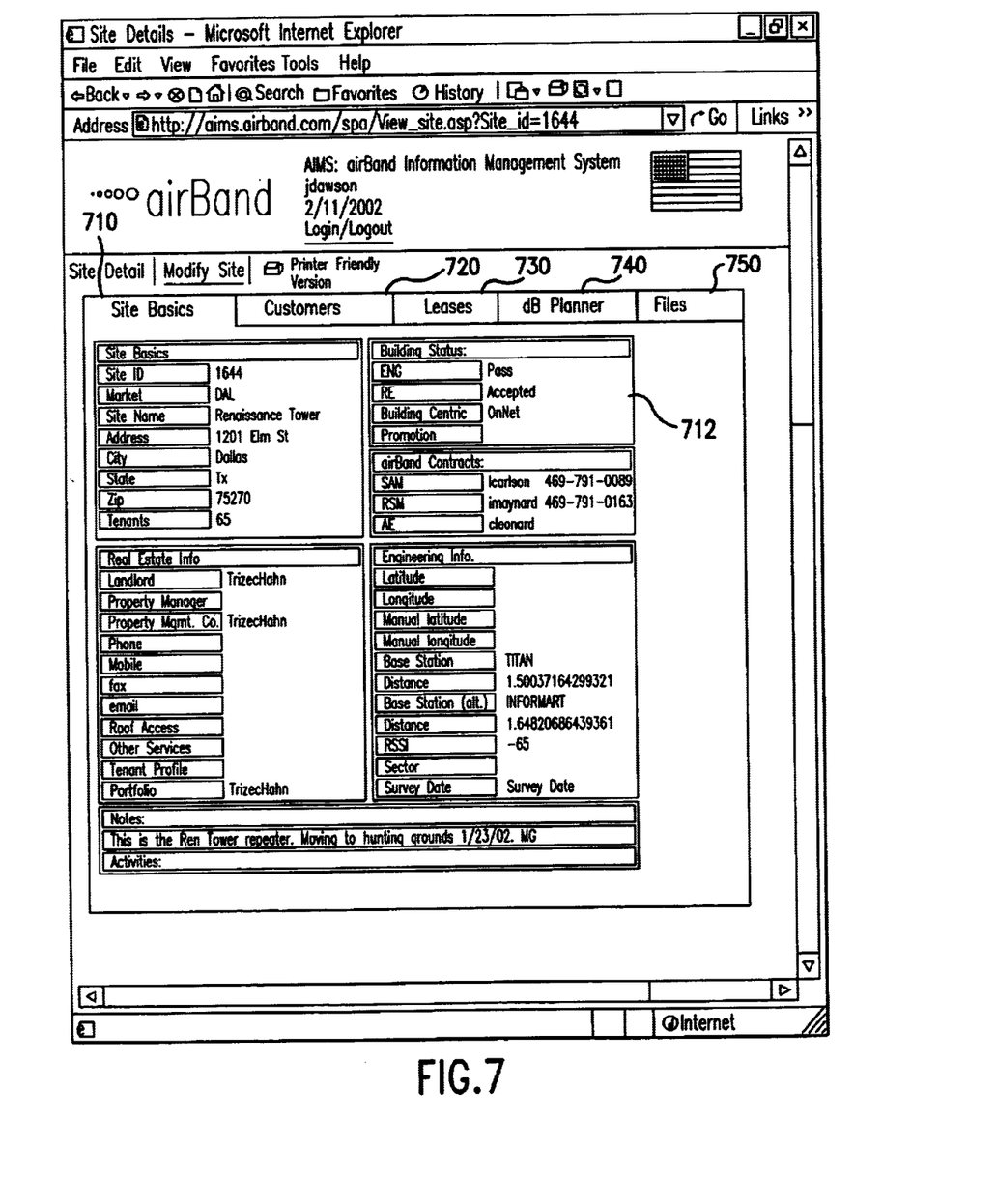
FIG. 7 is a screen shot of a site centric data display according to an embodiment of the present invention.

FIG. 7 is a screen shot of a site information web page 700 illustrating another site-centric information display. The web page 700 includes a site basics tab 710, a customers tab 720, a leases tab 730, a dB Planner tab 740 and a files tab 750. Selecting the site basics tab 710 calls up the window 712, which displays various information relative to a site, such as the site address, real estate information related to the site, and an identification of the nearest and next-nearest base station (hub) to the site. Selecting the customers tab results in the display of a list of customers for the site. Selecting the leases tab will provide images of lease documents pertaining to legal rights for the site. Selecting the dB Planner tab will result in the display of a propagation model image for the site such as the image 300 of FIG. 3. Finally, selecting the Files tab will result in a display of any other miscellaneous files associated with the site.

Figure 8:
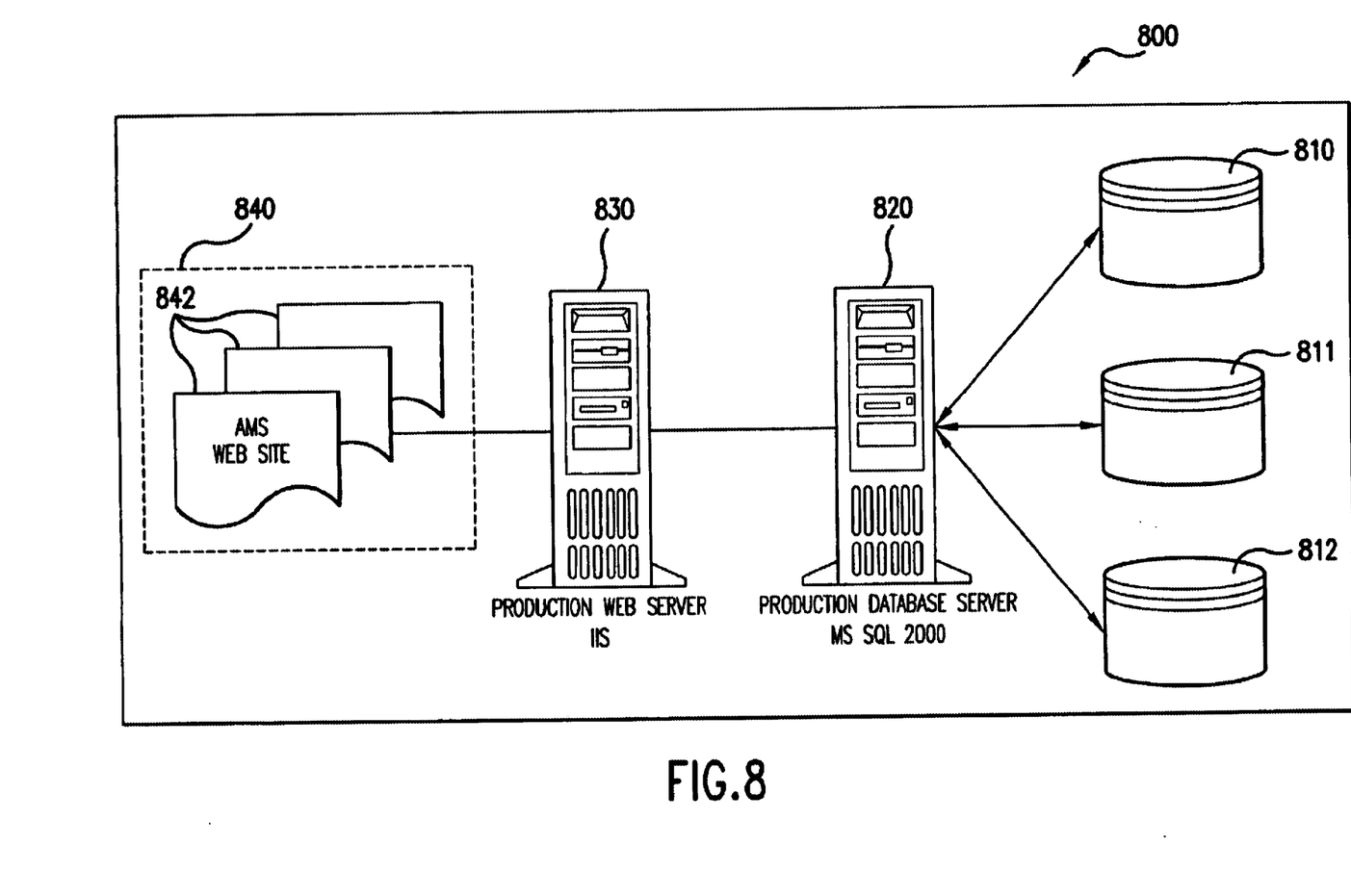
FIG. 8 is a hardware diagram of an information management system according to an embodiment of the present invention.

FIG. 8 is a hardware diagram of a system 800 according to one embodiment of the present invention. The system 800 comprises a plurality of storage devices 810–812 that store the various databases (e.g., the information used by the deciBel Planner application, site information, etc.) used by the system 800. The storage devices 810–812 are connected to a database server 820 (in preferred embodiments, the storage devices 810–812 are physically located inside the server 820). The database server 820 is connected to a web server 830. The web server 830 is connectable to a display device 840 (such as a personal computer with a web browser) for providing various web pages 780, such as the pages illustrated in FIGS. 2–7, to users of the system. It should be understood that the system 800 is exemplary only and that any number of modifications (e.g., replacing either server 820, 830 with a cluster of servers; implementing the system on a single physical device) are possible.

In the embodiments of the invention described above, the steps are described as being performed by persons associated with (e.g., employed by) the wireless service provider. In other embodiments of the invention, customers are allowed to perform certain steps. For example, in one embodiment, a potential customer who desires wireless service may initiate the process by entering its site on the Market List 110. Additionally, the customer may take other actions, such as indicating that, if a serviceable signal can be provided, legal rights will be granted on the wireless service provider's standard terms and conditions. Customers may also be given access to the deciBel planner to determine whether a serviceable signal can be supplied to that site. The types and amount of access to the system that can be given to potential customers can vary widely from none to total.

Obviously, numerous modifications and variations of the present invention are possible in light of the above teachings. It is therefore to be understood that within the scope of the appended claims, the invention may be practiced otherwise than as specifically described herein.

What is claimed is:

1. A computer implemented method for classifying a potential customer for a wireless communications service comprising the steps of:

accepting an indication as to whether legal rights to provide or gain access to a wireless infrastructure for a site can be or have been obtained, the site being in a target area, the target area including portions that are currently served by a wireless communications service provider and portions that are not currently served by the wireless communications service provider, the site having associated therewith at least one potential customer;

accepting an indication as to whether the site is in a portion of the target area that can be served by the wireless communications service provider;

assigning a priority classification to the site if the site is in a portion of the target area that can be served by the wireless communications provider and the legal rights for the site can be or have been obtained;

classifying potential customers at the site as priority potential customers if the site is classified as a priority site; and storing an indication of classifications of the potential customers on an electronic storage medium;

wherein the assigning, classifying and accepting steps are performed by a computer.

2. The method of claim 1, wherein the site has associated therewith a plurality of potential customers.

3. The method of claim 1, further comprising the step of assigning a rejected classification to the site if the legal rights cannot be obtained.

4. The method of claim 1, further comprising the step of assigning a coverage optimization classification to the site if the legal rights can be obtained and the site is in a portion of the target area that is not served by the wireless communications provider.

5. The method of claim 1, further comprising the step of recording that a commission is payable to a user upon an indication from the user that legal rights for a site have been obtained.

6. A system for managing data for a wireless service provider, the system comprising:

a storage device for storing a database, the database comprising information pertaining to a plurality of sites, each of the sites having associated therewith at least one potential customer;

a processor connected to the storage device, the processor configured to perform the steps of accepting, from a user, an indication as to whether legal rights to provide or gain access to a wireless infrastructure for a site can be or have been obtained;

accepting, from a user, an indication as to whether the site is in a portion of the target area that can be served by the wireless communications service provider;

assigning a priority classification to the site if the site is in a portion of the target area that can be served by the wireless communications provider and the legal rights for the site can be or have been obtained; and classifying a potential customer associated with the site as a priority potential customer if a priority classification has been assigned to the site.

7. The system of claim 6, wherein the site has associated therewith a plurality of potential customers.

8. The system of claim 6, wherein the processor is further configured to perform the step of assigning a rejected classification to the site if the legal rights cannot be obtained.

9. The system of claim 6, further comprising the step of assigning a coverage optimization classification to the site if the legal rights can be obtained and the site is in an area that is not served by the wireless communications provider.

10. The system of claim 6, further comprising the step of recording that a commission is payable to a user upon an indication from the user that legal rights for a site have been obtained.

11. The system of claim 6, wherein the database further includes information pertaining to a wireless service provider network and the processor is further configured to perform the steps of:

accepting an address from a user;

translating the address to latitude and longitude coordinates;

sending the latitude and longitude coordinates to a signal coverage estimation routine, the routine having access to the database;

receiving an estimate of signal coverage from the routine; and displaying the estimate.

12. The system of claim 11, wherein the estimate is displayed as an image of the site with color-coded areas indicating signal strength superimposed on the image.

* * * * *